US012641692B1

(12) United States Patent
  Swanson

(10) Patent No.:  US 12,641,692 B1
(45) Date of Patent:      May 26, 2026

(54) AUTOMOTIVE STROBE LIGHT SYSTEM

(71) Applicant: Neil James Swanson, Prescott, MI (US)

(72) Inventor: Neil James Swanson, Prescott, MI (US)

(73) Assignee: NJS DEVICES LLC, Prescott, MI (US)

( * ) Notice: Subject to any disclaimer, the term of this patent is extended or adjusted under 35 U.S.C. 154(b) by 0 days.

(21) Appl. No.: 19/441,533

(22) Filed: Jan. 6, 2026

Related U.S. Application Data

(60) Provisional application No. 63/910,886, filed on Nov. 4, 2025.

(51) Int. Cl.
  *H05B 45/30*      (2020.01)
  *B60D 1/62*       (2006.01)
  *B60Q 1/00*       (2006.01)
  *B60Q 1/52*       (2006.01)
  *B60Q 11/00*      (2006.01)
  *H05B 45/32*      (2020.01)

(52) U.S. Cl.
  CPC .............. *H05B 45/32* (2020.01); *B60D 1/62* (2013.01); *B60Q 1/0076* (2013.01); *B60Q 1/0094* (2013.01); *B60Q 1/52* (2013.01); *B60Q 11/005* (2013.01)

(58) Field of Classification Search
  CPC ........ H05B 45/10; H05B 45/32; H05B 45/37; H05B 47/10; H05B 47/17; B60D 1/62; B60Q 1/52; B60Q 1/0076; B60Q 1/0094; B60Q 11/005
  See application file for complete search history.

(56) References Cited

U.S. PATENT DOCUMENTS

| | | | |
|---|---|---|---|
| 9,481,331 | B1 | 11/2016 | Tucker et al. |
| 10,870,390 | B2 | 12/2020 | Tucker et al. |
| 11,518,298 | B2 | 12/2022 | Tucker et al. |
| 11,590,887 | B2 | 2/2023 | Tucker et al. |
| 11,981,254 | B2 | 5/2024 | Tucker et al. |
| 12,263,784 | B2 | 4/2025 | Tucker et al. |

(Continued)

FOREIGN PATENT DOCUMENTS

| | | |
|---|---|---|
| AU | 2016262723 A1 | 5/2018 |
| AU | 2018205070 A1 | 3/2020 |

(Continued)

OTHER PUBLICATIONS

Patents listed on this form are owned by ESS Help Inc. https://www.ess-help.com/.

(Continued)

*Primary Examiner* — Jimmy T Vu

(57) ABSTRACT

An aftermarket Automotive Strobe Light System is disclosed that uses a vehicle's existing emergency flashers and activation button that are on all production vehicles. The existing flashers are activated as strobe lights using the existing emergency flasher button in a pre-programmed sequence using distributed strobe light control modules installed locally at existing flasher lamps and powered solely by the pulsed flasher signal. An auxiliary wire is also provided to power additional strobe lights if desired. Installing a set of unique strobe lights and activation switch are not necessary, eliminating the concern of modifying new vehicles.

16 Claims, 12 Drawing Sheets

Figure 1:
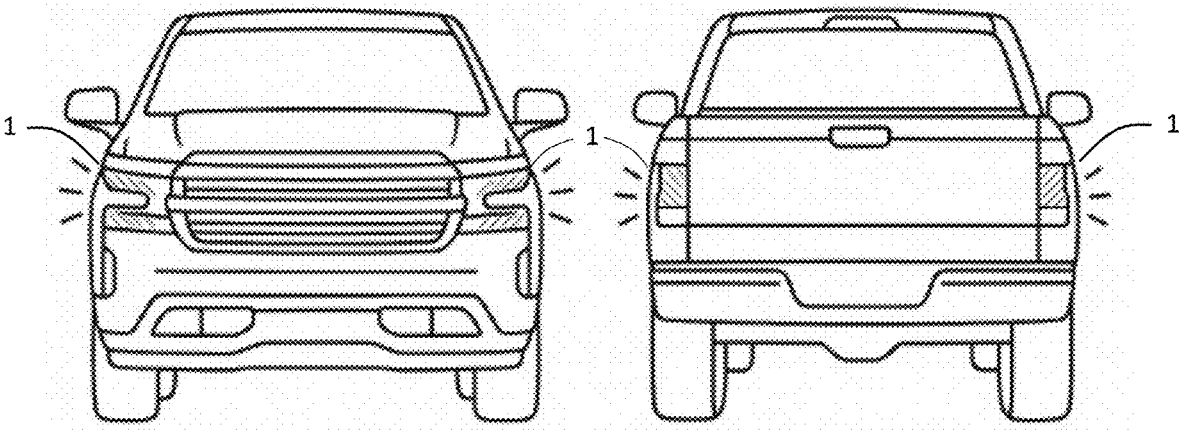

Base-Level Direct Wire Splicing Installation
Wiring Schematic for each Flasher/Lighting Unit

(56) References Cited

U.S. PATENT DOCUMENTS

| | | | |
|---|---|---|---|
| 2005/0099286 A1* | 5/2005 | DeYoung | B60Q 1/46 |
| | | | 340/463 |
| 2016/0144778 A1 | 5/2016 | Tucker et al. | |
| 2020/0189453 A1 | 6/2020 | Tucker et al. | |
| 2020/0276946 A1 | 9/2020 | Tucker et al. | |
| 2022/0063489 A1 | 3/2022 | Cobb et al. | |

FOREIGN PATENT DOCUMENTS

| | | |
|---|---|---|
| AU | 2019226226 A1 | 5/2021 |
| AU | 2021218203 B2 | 10/2023 |
| CA | 2942926 C | 5/2017 |
| CN | 106852137 | 12/2019 |
| CN | 110949242 | 2/2024 |
| EP | 3177484 B1 | 8/2020 |
| EP | 3519246 B1 | 4/2024 |
| JP | 6523320 | 5/2019 |
| JP | 6975780 | 12/2021 |
| JP | 7513629 B2 | 7/2024 |
| KR | 102070857 B1 | 12/2018 |
| KR | 102310984 B1 | 10/2021 |
| WO | 2018063253 A1 | 4/2018 |

OTHER PUBLICATIONS https://ultrabrightlightz.com/ Use the existing OBD2 port under the vehicle dash to interject CANBUS control signals to manage the existing lights.

https://speedturtleengineering.com/ Use the existing OBD2 port under the vehicle dash to interject CANBUS control signals to manage the existing lights.

https://atomicled.com/ Uses direct connections between the Body Control Module (BCM) and the Light Control Module (LCM).

\* cited by examiner

Typical Existing Vehicle Emergency Flashers

Typical Existing Vehicle Emergency Flasher Activation Button

Base-Level Direct Wire Splicing Installation
Wiring Schematic for each Flasher/Lighting Unit Base-Level Direct Wire Splicing Installation
Right Rear Tail Light Example Plug and Play Installation
Wiring Schematic for each Flasher/Lighting Unit Plug and Play Installation
Right Rear Tail Light Example Existing Emergency Flasher Square Wave to Flasher
Lights Generated by the Vehicle Existing Emergency Flasher Square Wave to Flasher
Lights Generated by the Vehicle Mode A Output -  Square Wave Mode B Output
4-Pulse Strobe Square Wave Existing Emergency Flasher Square Wave to Flasher
Lights Generated by the Vehicle Mode C Output
4-Pulse Wig-Wag Strobe Square Wave Logic Flow Chart

* - Output dependent on Wig-Wag Enable Switch 22 position

Strobe Light Control Module Block Diagram

AUTOMOTIVE STROBE LIGHT SYSTEM

BACKGROUND

Automotive emergency flashers, also known as hazard lights, hazard blinkers or four-way flashers, should be used to warn other drivers to proceed with caution when a vehicle poses a dangerous or emergency situation. Examples include stopped on the roadside to change a tire, a vehicle breakdown, an accident or a sudden stop in traffic. They are also appropriate when driving unusually slow like in a funeral procession or due to a mechanical issue. Automotive emergency flashers are standard in all production vehicles worldwide. The front flashers, located on each front corner of the vehicle are always amber in color. The rear flashers, located on each rear corner of vehicles are either red or amber color. The flashers also function as turn signals for the vehicle when only the left or right side of the vehicle is activated by the turn signal lever rather than the emergency flasher button. In some applications the rear red emergency flashers are also the brake lights.

Vehicle strobe lights on the other hand are required for specific authorized emergency vehicles, such as police, fire, ambulance, and for those engaged in non-emergency activities such as vehicles used for towing, construction, utility, and security. These lights alert other drivers to the vehicle's presence and the potential for a hazardous situation. Depending on regulations, emergency vehicles are authorized to have red strobes in the rear whereas other vehicles equipped with strobes must have alternative colors.

There are currently two main types of strobe light systems available in the marketplace. All strobe systems are controlled with switches located inside the vehicle. The first strobe light system and most popular is where each individual strobe light is hard wired throughout the vehicle exterior. These lights can have separate individual strobe control or can be managed by a central strobe controller. Some strobe lights are actual existing lights on the vehicle or the existing light housing is modified to accept a separate strobe light. The main concerns for this system are the initial material cost, man-hours to install and the permanent impact it has on the vehicle. Many owners of newer vehicles are reluctant to modify their new and expensive vehicles with the necessary permanent modifications for strobe lights.

An alternative second strobe light system mainly uses existing vehicle lights. This approach minimizes vehicle modifications. They work by either having a module that is inserted into the OBD2 port of the vehicle or inserted with connectors between the vehicle's Body Control Module (BCM) and the Lighting Control Module (LCM). These systems rely on CANBUS communications. These systems are gradually becoming obsolete as more and more automakers are increasingly integrating lighting functions into the Body Control Module (BCM) as part of a broader trend toward centralizing vehicle electronics. The BCM is already the central hub for managing most body-related functions, including lighting. While some vehicles still use a separate lighting control module (LCM), the move to a more consolidated architecture is the dominant industry trend eliminating the ability of third party companies to access the lights through CANBUS communication. Also, these systems are complicated to install when connecting to the BCM and expensive to purchase.

SUMMARY

A third alternative strobe light system is now required that is low cost and easy to install requiring minimal man-hours and will not become obsolete in the foreseeable future. An aftermarket automotive strobe light system is disclosed that uses a vehicle's existing emergency flashers and is activated using the existing emergency flasher button typically located in the center of the instrument panel. These existing emergency flashers and the corresponding activation button are on all production vehicles worldwide. The existing emergency flashers are activated as strobe lights using the existing emergency flasher button in a pre-programmed sequence. If the vehicle still has incandescent flasher bulbs, they should be updated to LED bulbs.

There are two embodiments of the Automotive Strobe Light System. One embodiment consists of splicing a Strobe Light Control Module (SLCM) into only two wires connecting the existing flasher lights to the body control/lighting control modules or on older vehicles between the existing flasher lights and the flasher module. This splice would typically be near each flasher/lighting unit in the four corners of a vehicle. So, four Strobe Light Control Modules would be required-one for each light. On vehicles that also have flashers on the side, for example on the mirrors, then a separate Strobe Light Control Module would likely be required if the installer has access to the wiring. Trailer flashers can also be activated as strobes if the trailer flasher lights are connected between the Strobe Light Control Modules and the tow vehicle rear lights. If not, then two additional separate Strobe Light Control Modules would be required for each trailer flasher/lighting unit.

The other embodiment is considered plug-and-play by inserting the Strobe Light Control Module into the existing vehicle light circuit at each existing flasher/lighting unit using matching vehicle-specific lighting plugs and receptacles. This embodiment would have higher initial material cost and complexity (multiple connectors), but lower man-hours to install.

An auxiliary wire is also provided with each strobe light control module to power additional LED strobe lights if desired. Each strobe light control module also has a switch that allows the installer to toggle the rear strobes between using the existing red flashers as strobes or using a separate alternative color light as some applications cannot use red in the rear as noted earlier.

A unique element of this system is how it is powered. The power to run the strobe light control module, drive the flasher as strobes and to power the auxiliary strobes comes strictly from the pulsed 12 volts that currently goes to each flasher/lighting unit. There is a strobe mode called wig-wag that does require a steady 12 volts and is available with each strobe light control module.

If the vehicle operator activates the flashers with the existing emergency flasher button, the flasher lights work as normal. To turn the flashers into strobe lights, the vehicle operator simply turns on the existing emergency flashers as normal. The fourth flash or blink as seen from the passenger compartment on the blinker indicators and possibly also the actual existing emergency flasher button activates the 4× strobe system (will also activate at 5 flashes). If the flashers are turned off after the fourth flash, then turned back on, the lights turn into strobes with a 4× strobe blink rate. If the flasher button is turned back off and then on again the lights resume flash mode as before. If the vehicle operator turns on the flashers, but now wants 4× strobe blink rate but at a reduced brightness level, then the sixth flash activates the 4× reduced brightness dim strobe mode (will also activate at 7 flashes). If the flashers are turned off after the sixth blink, then turned back on, the lights turn into strobes with a 4× strobe blink rate but at a reduced brightness level. This reduced brightness could be useful if the vehicle is used at locations requiring strobe lights, but at a reduced intensity level. If the flasher button is turned back off and then on again the lights resume flash mode as before. The design of the Automotive Strobe Light System is capable of generating any strobe rate. However, a strobe blink rate of four is typical.

DRAWING DESCRIPTIONS

FIG. 1: Typical Existing Vehicle Emergency Flashers

Figure 2:
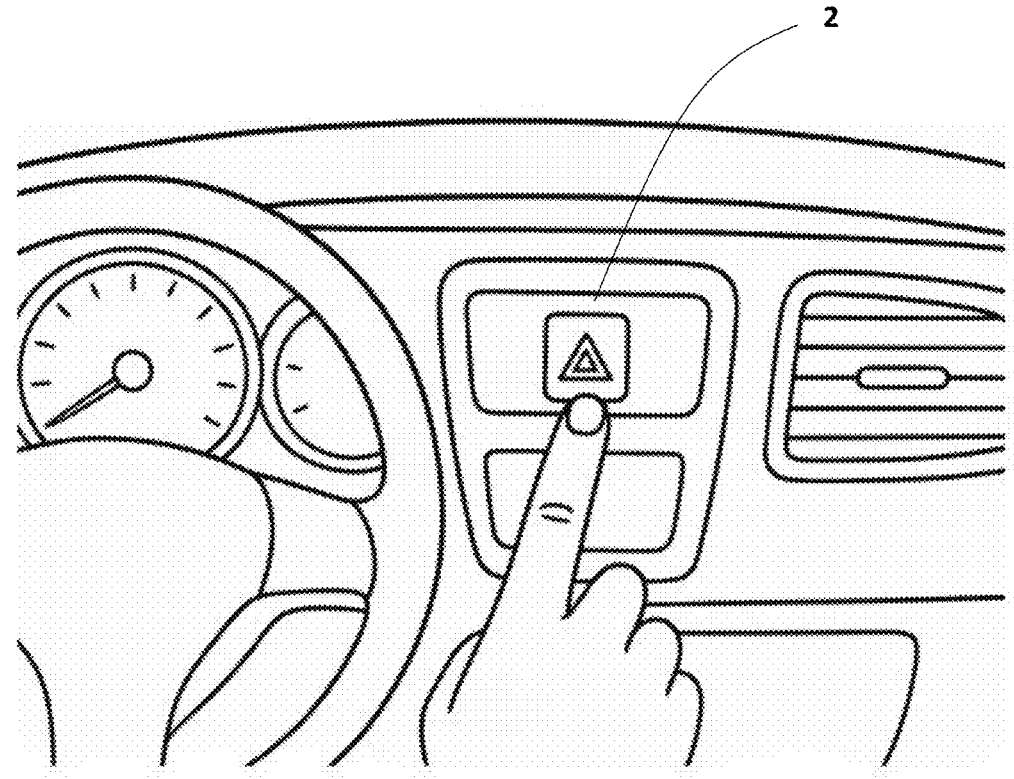

FIG. 2: Typical Existing Vehicle Emergency Flasher Activation Button

Figure 3:
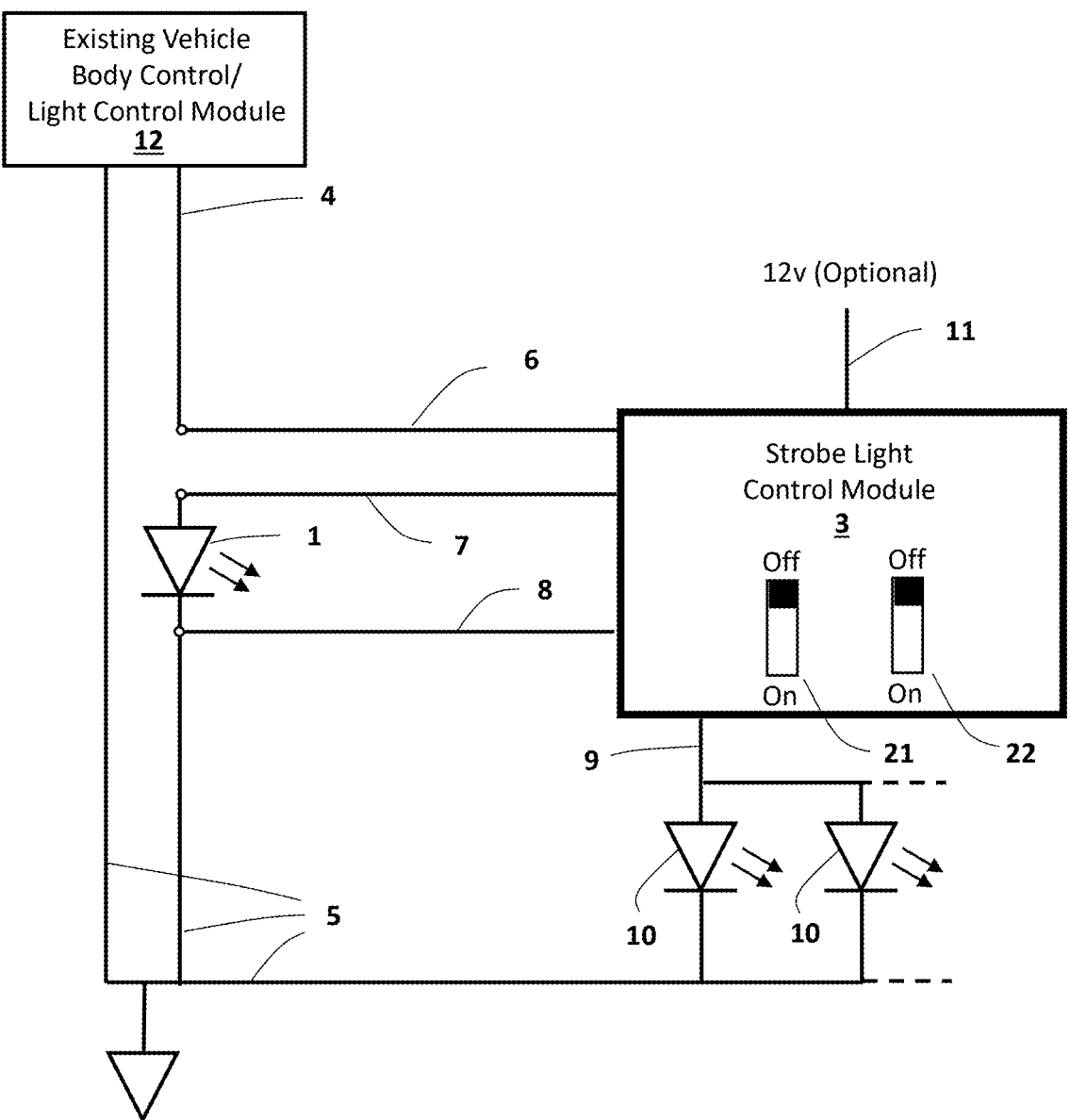

FIG. 3: Base-Level Direct Wire Splicing Installation Wiring Schematic for each Flasher/Lighting Unit FIG. 4: Base-Level Direct Wire Splicing Installation Right Rear Tail Light Example FIG. 5: Plug and Play Installation Wiring Schematic for each Flasher/Lighting Unit FIG. 6: Plug and Play Installation Right Rear Tail Light Example FIG. 7: Existing Emergency Flasher Square Wave to Flasher Lights Generated by the Vehicle FIG. 8: Mode A Output—Square Wave FIG. 9: Mode B Output-4—Pulse Strobe Square Wave FIG. 10: Mode C Output-4—Pulse Wig-Wag Strobe Square Wave FIG. 11: Logic Flow Chart FIG. 12: Strobe Light Control Module Block Diagram

DETAILED DESCRIPTION

The Automotive Strobe Light System is a novel approach to creating vehicle strobe lights. The system uses the existing emergency flashers 1 (FIG. 1) and the existing emergency flasher activation button 2 typically located in the center of the instrument panel (FIG. 2). More and more newer vehicles have integrated headlight and taillight units where the consumer does not have access to the individual light bulbs. This will become more and more prevalent in the future. For now, some lights have a combination of sealed/integrated lighting units with some halogen, incandescent and LED bulbs accessible for replacement. The existing emergency flashers 1 are typically either incandescent or LED bulbs. Where the bulbs are incandescent, they can usually be replaced with LED. To work effectively as a rapid-pulse strobe light, the incandescent bults should be replaced with LED bulbs. LED bulb replacements are widely available in the market place. The Automotive Strobe Light System assumes LED flasher lights that are either integrated into the lighting modules or are LED bulbs.

The central component of the Automotive Strobe Light System is the Strobe Light Control Module (SLCM) 3 (FIG. 3). Because of the complexity and myriad of lighting systems, The SLCM 3 is directly connected to the existing wiring at each existing emergency flasher 1. The base-level Automotive Strobe Light System has specific connections to just the existing emergency flasher wire (it is also the turn signal and in some cases also brake) 4 and the existing ground wire 5 at each existing emergency flasher 1. So, four SLCMs 3 would be required-one for each corner of the vehicle. The existing emergency flasher wire 4 is cut near the existing emergency flasher 1. Flasher-In wire 6 of the SLCM 3 is connected to the existing BCM/LCM 12 side of the existing emergency flasher wire 4. The Flasher/Strobe-Out wire 7 is connected to the light side of the existing emergency flasher wire 4. The SLCM Ground-Out wire 8 is connected to the existing ground wire 5 that runs from the existing BCM/LCM 12 to the existing emergency flasher 1 or to the vehicle chassis. An additional auxiliary strobes lead wire 9 from SLCM 3 is available for additional direct-wire strobe lights 10 of alternative colors such as white, amber, green or blue. It would also be possible to use the auxiliary strobe lead wire 9 to communicate to the operator the status of each SLCM 3. This could be accomplished with a direct connection to an exterior strobe visible to the operator or wirelessly to LED indicators inside the passenger compartment. If additional existing strobe lights are used that are already managed by an existing strobe light controller, the auxiliary strobe lead wire 9 could be used as an on/off enabler. As noted earlier, some regulations require that rear strobe lights can only be red for specific emergency applications. To accommodate this situation, a strobe disable switch 21 is provided on the SLCM 3. When activated on the rear SLCMs 3, the existing emergency flashers 1 will not be activated. In this situation, the rear SLCM 3 auxiliary strobe lead wire 9 would be connected to auxiliary direct-wire strobe lights 10 with alternative colors.

There are two strobe patterns generated with this current disclosure. The first strobe pattern is where all of the existing emergency flashers 1 that are made to strobe and the auxiliary direct-wire strobe lights 10 strobe together at the same rate. The second strobe pattern is called wig-wag. This is where the strobes alternate back and forth from one side of the vehicle to the other. The wig-wag strobe effect is activated by a switch 22 on the SLCM 3. This strobe effect also requires a direct 12 volt power wire 11 connection to the SLCM 3.

Figure 4:
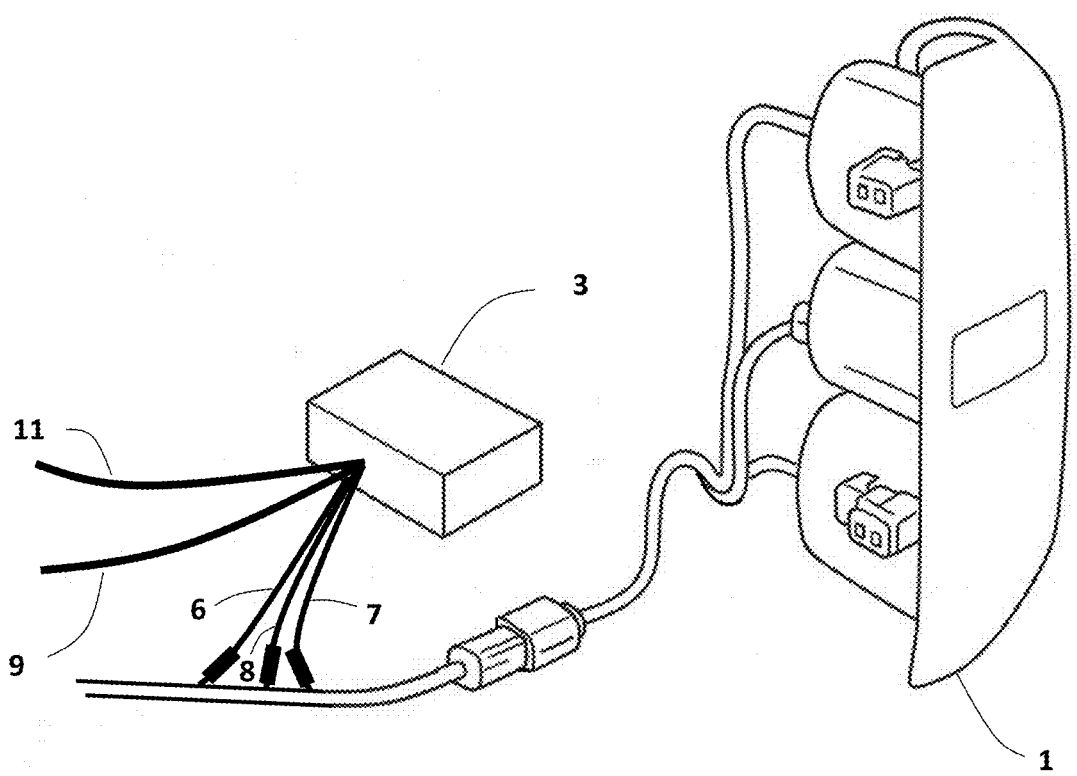

FIG. 4 is a pictorial of the base-level direct wire splicing installation using a right rear tail light that would include an existing emergency flasher 1 as an example based on the circuit described in FIG. 3. In this example, the SLCM 3 can be located anywhere near the right rear corner of the vehicle giving easy access to the existing wires going to the light/flasher unit. SLCM 3 flasher-in wire 6, flasher/strobe-out wire 7 and ground-out wire 8 are connected to the existing wires as noted earlier. Auxiliary strobe lead wire 9 is shown available. Also show, is the 12v power wire 11 that is available should the installer desire the wig-wag function.

Figure 5:
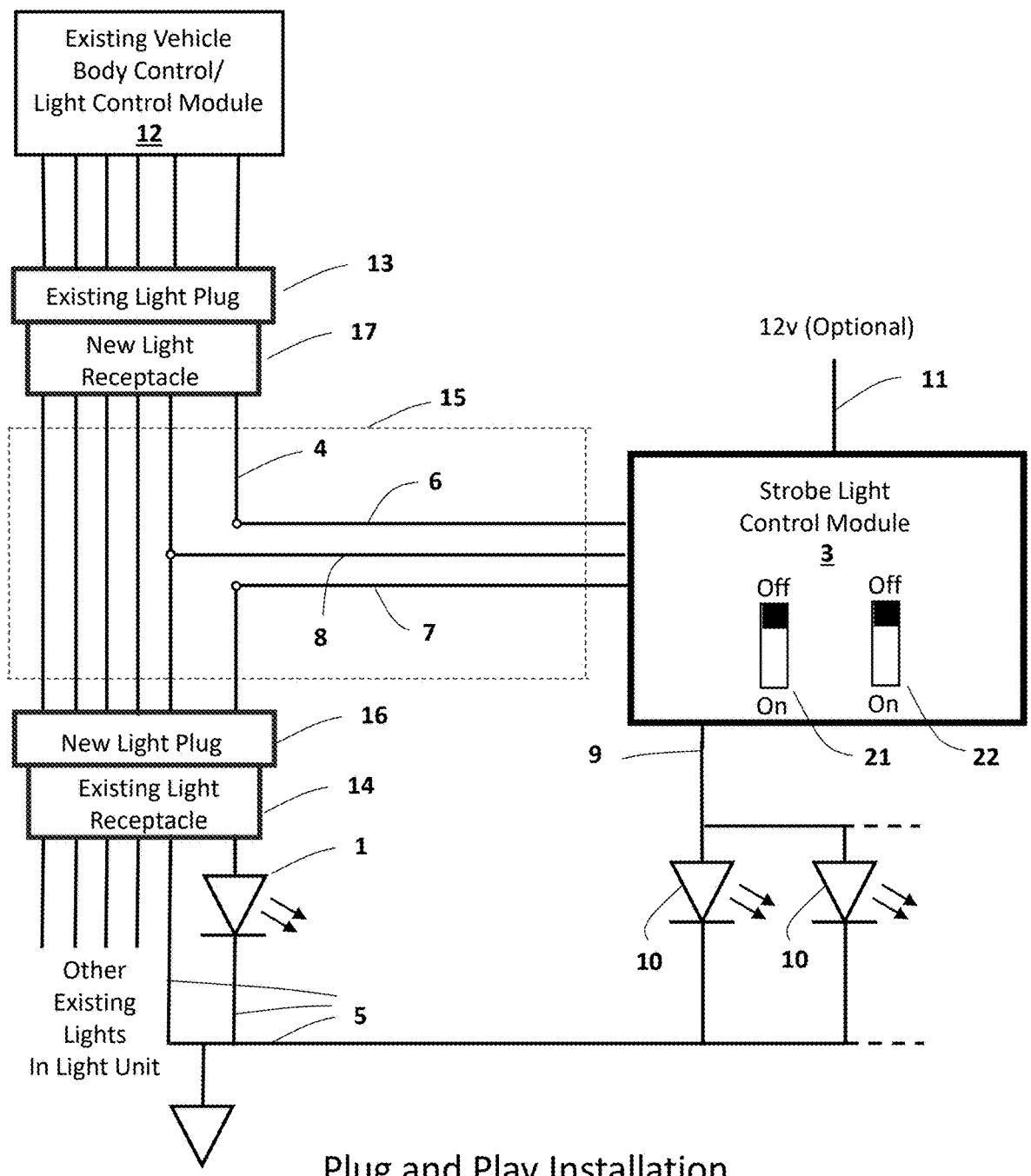

FIG. 5 is an up-level embodiment with direct Plug and Play connections. As in the base-level system, the location of the SLCM 3 should be near each existing vehicle flasher 1. The Plug and Play embodiment has more complexity and material cost as the connectors are vehicle and model year specific, but requires fewer man-hours to install. The existing light plug 13 is disconnected from the existing light receptacle 14 of the existing emergency flasher 1 or entire lighting unit. A short new wire harness 15 with a new light plug 16 is connected to the existing light receptacle 14 of the existing emergency flasher/lighting unit 1. The other end of the short wire harness has a new light receptacle 17 where the existing light plug 13 is connected. Included with the new wire harness 15 are three wires; flasher-In wire 6, flasher/strobe-out wire 7 and ground-out wire 8 that are connected to the SLCM 3. Also, same as the base-level embodiment, auxiliary strobe lead wire 9 is connected to direct-wire strobe lights 10. Also, a 12v power wire 11 is available should the installer desire the wig-wag function. As noted earlier, some regulations require that rear strobe lights can only be red for specific emergency applications. To accommodate this situation, a strobe disable switch 21 is provided on the SLCM 3. When activated on the rear SLCMs 3, the existing emergency flashers 1 will not be activated. In this situation, the rear SLCM 3 auxiliary strobe lead wire 9 would be connected to auxiliary direct-wire strobe lights 10 with alternative colors.

As noted earlier for the direct-wire embodiment, there are two strobe patterns generated with this plug and play disclosure. The first strobe pattern is where all of the existing emergency flashers 1 that are made to strobe and the auxiliary direct-wire strobe lights 10 strobe together at the same rate. The second strobe pattern is called wig-wag. This is where the strobes alternate back and forth from one side of the vehicle to the other. The wig-wag strobe effect is activated by a switch 22 on the SLCM 3. This strobe effect also requires a direct 12 volt power wire 11 connection to the SLCM 3.

Figure 6:
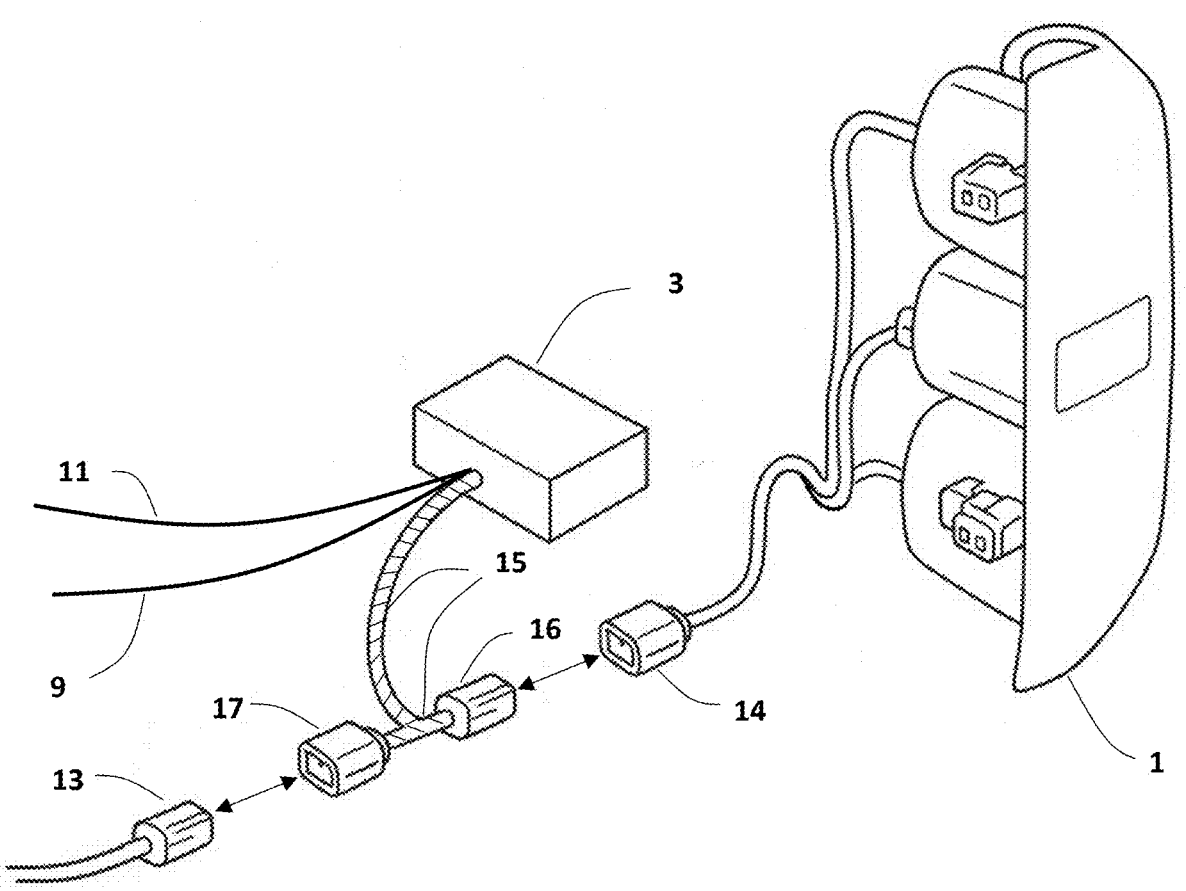

FIG. 6 is a pictorial of the plug and play installation using a right rear tail light that would include an existing emergency flasher 1 as an example based on the circuit described in FIG. 5. In this example, the SLCM 3 can be located anywhere near the right rear corner of the vehicle giving easy access to the existing light plug 13 and receptacle 14 going to the existing flasher. The existing light plug 13 is disconnected from the existing light receptacle 14 of the existing emergency flasher 1. A short new wire harness 15 with a new light plug 16 is connected to the existing light receptacle 14 of the existing emergency flasher 1 (sometimes in a lighting unit). The other end of the short new wire harness 15 has a new light receptacle 17 where the existing light plug 13 is connected. Included in the new wire harness 15 are three wires; flasher-In 6, Flasher/Strobe-Out 7 and Ground-Out 8 that are connected to the SLCM 3 as shown in FIG. 5. Also, same as the base-level embodiment, auxiliary strobe lead wire 9 and 12v power wire 11 are available.

Figure 7:
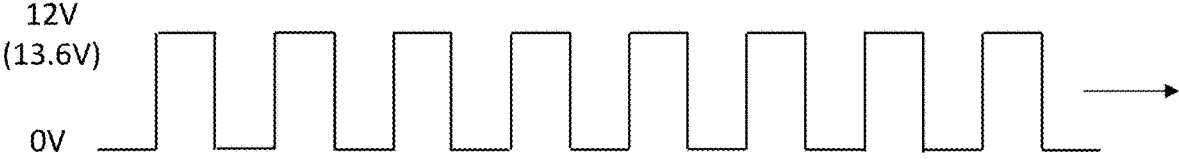

FIG. 7 is a representative depiction of a typical existing emergency flasher square wave signal. The signal ranges from ground to vehicle battery voltage of 12v. The voltage can be as high as the charging voltage of approximately 13.6 volts. The signal frequency is typically measured in flashes per minute or Hertz (Hz). For vehicle emergency flashers and turn signals, the standard frequency is between 60 and 120 flashes per minute (1-2 Hz), with a common specification being (90+/−30) flashes per minute (1.5+/−0.5 Hz).

Figure 8:
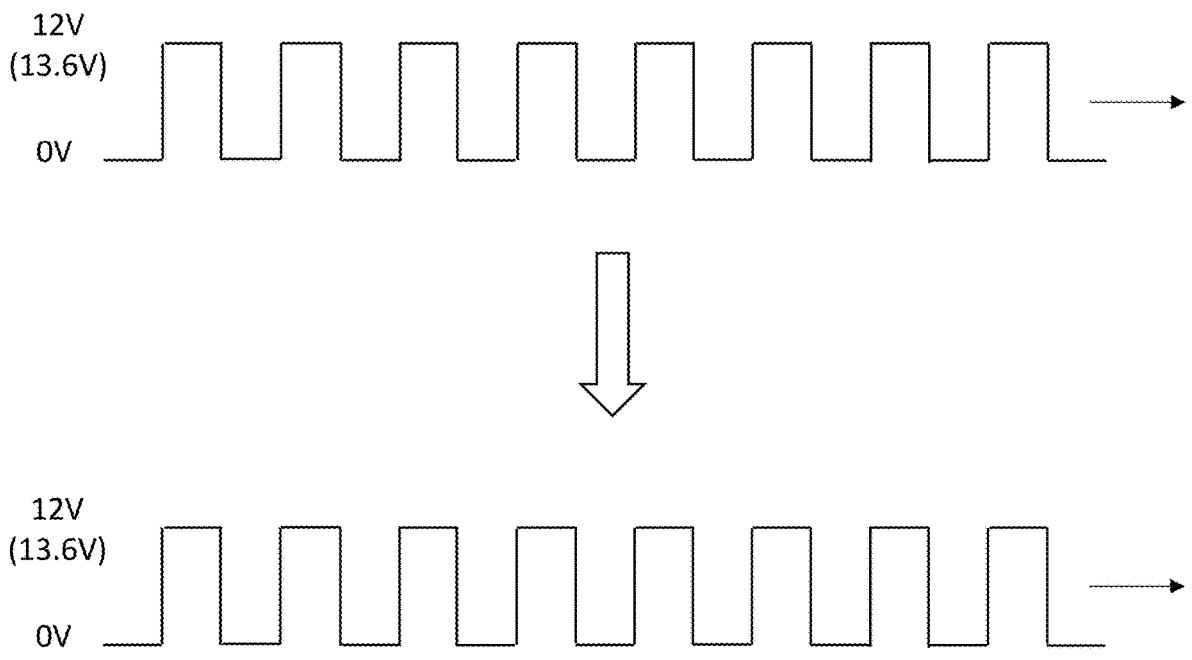

There are three user-selectable modes in this embodiment of the Automotive Strobe Light System-Mode A, Mode B and Mode C. The exact process of selecting these modes will be covered later with FIG. 11. FIG. 8 depicts Mode A. Mode A replicates the existing emergency flasher square wave that is sent to the existing vehicle flashers 1 as currently provided by the vehicle.

Figure 9:
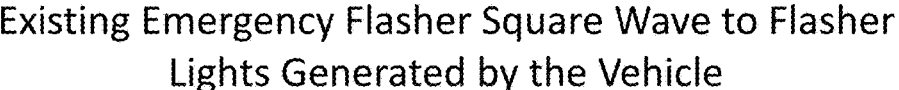
Figure 9:
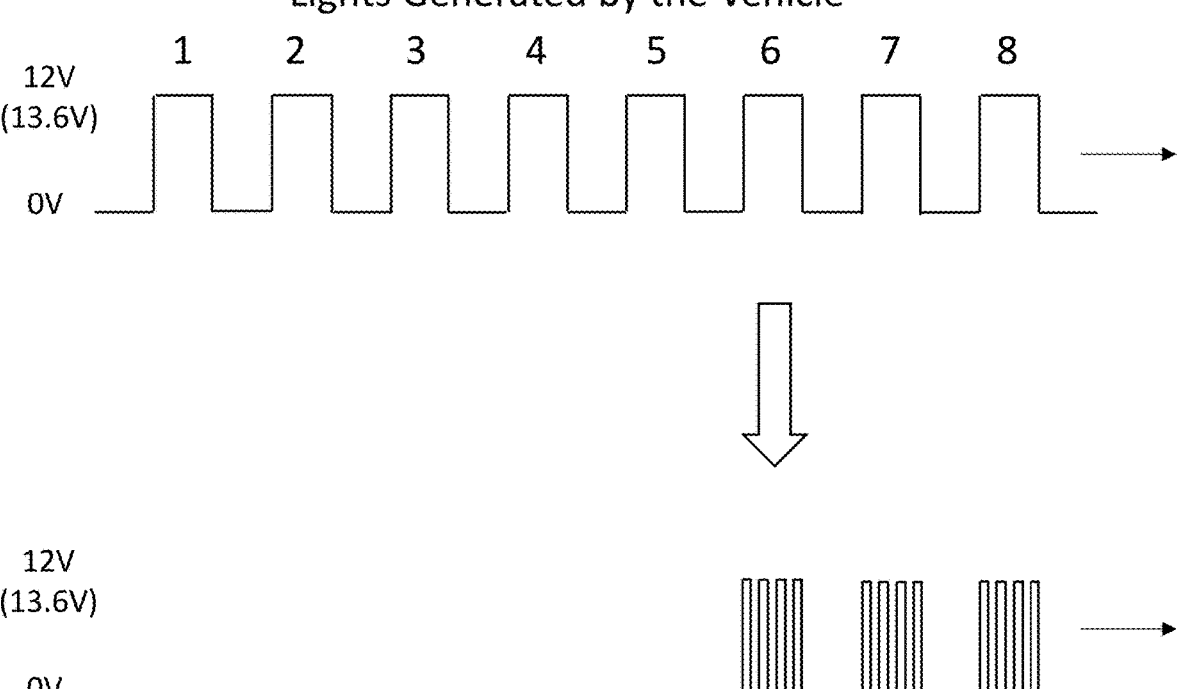

FIG. 9 depicts Mode B. Mode B is a strobe mode where the existing emergency flashers 1 now strobe at a 4× pulse rate as shown. There are four strobe pulses during the time that the existing emergency flashers 1 would have pulsed once. The strobes are turned off the same amount of time as when the existing emergency flashers 1 signal is 0 volts. The reason for this is that the strobe effect is powered by the same pulsed flasher square wave rather than a steady 12 volt power source. There may be situations where the strobe brightness needs to be reduced. The process for activating the reduced brightness level and the strobe effect will be covered with FIG. 11.

Figure 10:
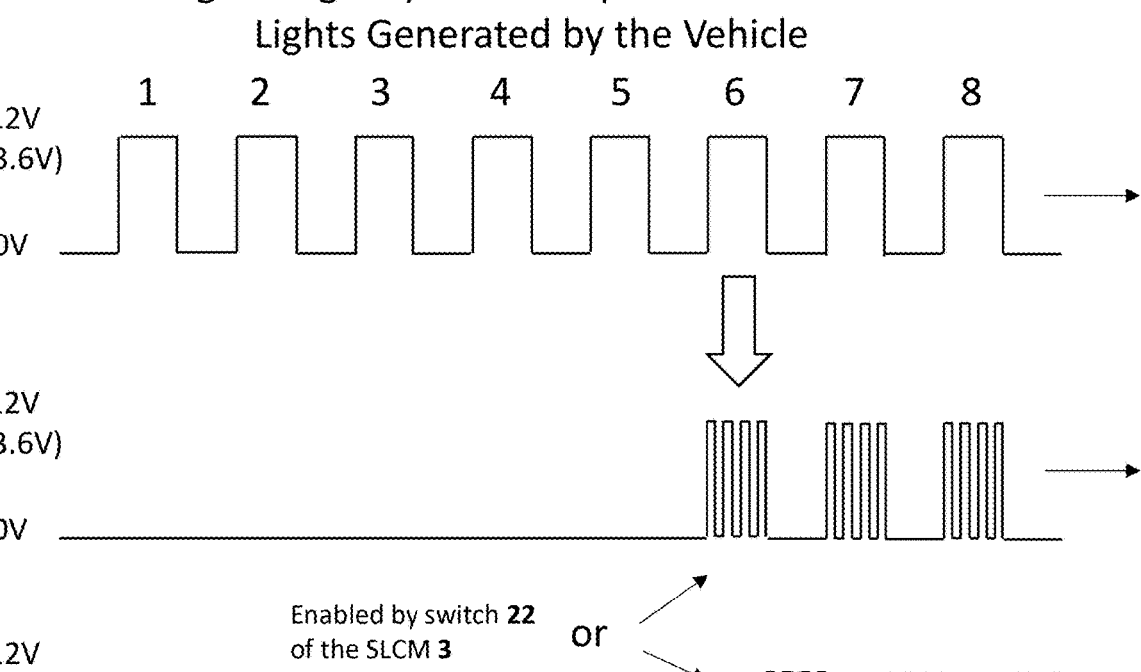

FIG. 10 depicts Mode C. Mode C is also a 4× strobe mode where the existing emergency flashers 1 still strobe at a 4× pulse rate. However, the strobe effect alternates between the left and right side of the vehicle. To enable this wig-wag effect, switch 22 on a left or right side SLCM 3 is enabled. Again, there may be situations where the strobe brightness needs to be reduced. The process for activating the reduced strobe brightness level and the strobe effect will be covered with FIG. 11.

As noted earlier, some rear red flashers/turn signals are also the brake lights. When this is the case, the existing emergency flasher wire 4 also carries the brake on/off signal. The SLCM 3 accommodates this situation by allowing the brake lights to be activated when the flashers/strobes are not on.

Figure 11:
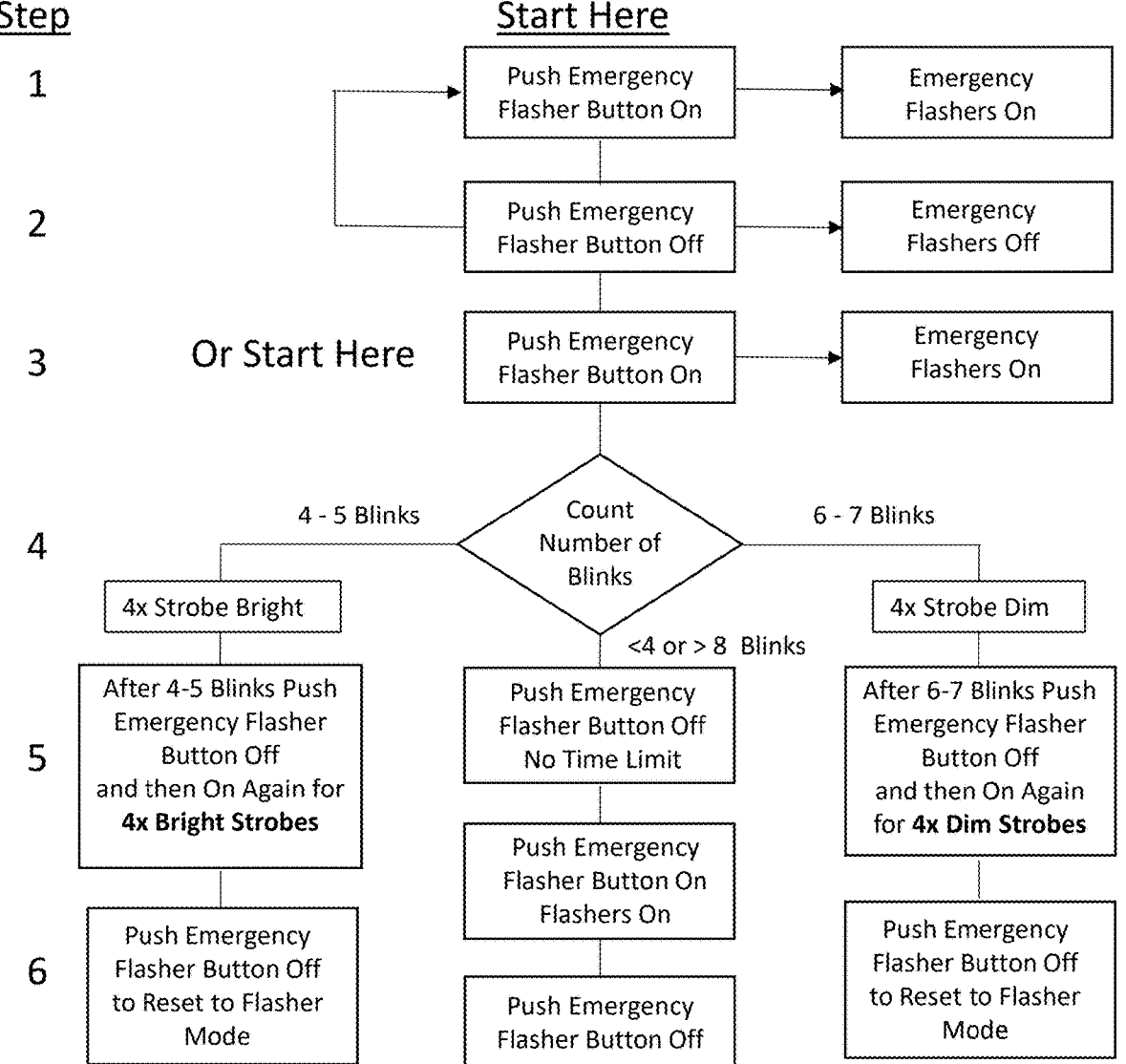

FIG. 11 is the logic flow of how the vehicle operator activates the existing emergency flashers vs, the strobe lights. Referring back to FIGS. 1 and 2, the vehicle operator just has to push the existing emergency flasher button 2 to activate the existing emergency flashers 1 as flashers or as strobes. Starting with Step 1 at the top of FIG. 11, the operator pushes on the existing emergency flasher button 2 to start the existing emergency flashers 1. This is consistent with existing normal operator actions. The existing emergency flasher button 2 is a push on-push off design. Push once to turn it on. Push it again to turn it off. Pushing in and holding the button has no effect. Step 2, pushing the existing emergency flasher button 2 again, turns off/deactivates the existing emergency flashers 1. This process continues as normal for as long as the operator desires to just use the existing emergency flashers 1. Step 3, 4 and 5 depicts the necessary operator actions to turn the existing emergency flashers 1 into strobe lights. Again, no new switches are required. The key to the Automotive Strobe Light System is the use of the existing emergency flashers 1 and the existing emergency flasher button 2. Step 3 just reflects the operator activating the existing emergency flashers 1 again. This time, Step 4, requires the operator to count the number of flashes or blinks on the turn signal indicators on the instrument panel and also possibly the actual existing emergency flasher button 2. The blinks on the instrument panel are synced with the existing emergency flashers 1. As shown in Step 5, if the operator, after four blinks (design allows four or five), pushes the existing emergency flasher button 2 again to turn off/deactivate the existing emergency flashers 1 and then pushes the existing emergency flasher button 2 again within a few seconds to turn the existing emergency flashers 1 into strobes at a 4× blink rate. If this is done after six blinks (design allows six or seven) instead of four, the existing emergency flashers 1 turn into strobes at a 4× blink rate, but at a reduced brightness level. If the operator does this maneuver at less than four blinks or more than eight blinks, the existing emergency flashers 1 remain as flashers. As shown in Step 6, if the operator pushes the existing emergency flasher button 2 again, the strobes/flashers turn off/deactivate. A person has sufficient reaction times to count flashes/blinks and execute the push-push operation. As noted, an additional pulse is allowed—4 or 5 and 6 or 7—to ensure the operator has sufficient reaction time.

Figure 12:
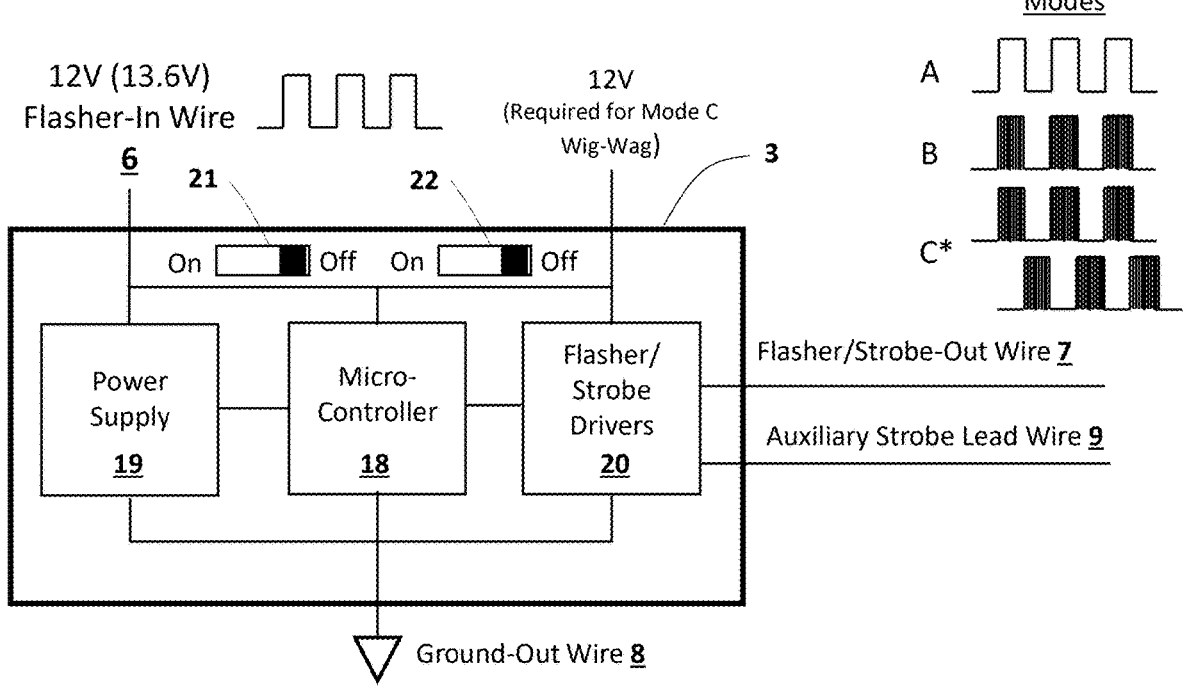

FIG. 12 is a block diagram of the Strobe Light Control Module 3. The heart of the circuit is a microcontroller 18. This controller operates strictly on the 12v emergency flasher pulse-in signal. So, during the square wave off time (approximately up to 2 seconds) the microcontroller needs to rely on stored power. This novel approach is accomplished using a—pulse to direct current—power supply 19. This approach eliminates the need to supply the circuit with a steady 12 volt power which may not be available near the lighting circuit. The 12 volt pulsed-signal is also provided as signal input to the microcontroller 18 and pulsed-power to the flasher/strobe drivers 20. The output of the microcontroller 18 reflects Modes A, B, C to the flasher/strobe drivers 20 where they are converted to higher output levels capable of powering the vehicle's LED flasher/strobe lights. Strobe disable switch 21 and the wig-wag enable switch 22 are usually permanently set during installation. If the wig-wag function is desired, a steady 12 volts will need to be provided to the flasher/strobe drivers 20.

PRIOR ART

There is only one patent (including earlier and foreign country variants) that broadly discloses a vehicle strobe light system that uses existing vehicle emergency flashers (hazard lights) and the use of an existing occupant accessible switch. Patent U.S. Pat. No. 12,263,784B2, Enhanced Communication System for Vehicle Hazard Lights, discloses a general system for using existing flashers. It has inaccuracies and lacks specificity; therefor fails to teach or suggest actual implementation. The claims of this patent essentially describe the existing automaker's flasher systems and the implementation of post-production strobe lighting. The actual implementation of this design would prove to be very complex and costly with many man-hours to install if even feasible without the automakers involvement. More and more automakers are integrating their vehicle emergency flashers (hazard lights) into the Body Control Module (BCM)/aka—vehicle computer management system—making it impossible for aftermarket suppliers to control or even access the input side of the BCM. Patent U.S. Pat. No. 12,263,784B2 and earlier versions was applied for by ESS Help, Inc, and is the licensee. The implementation of their technology is in modifying existing OEM programs, focused on automatic implementation and the use of an auxiliary switch for manual actuation if desired. The present disclosure is an aftermarket kit that is low cost, simple to install and operate with minimal impact on the vehicle. The present disclosure has four independent Strobe Light Control Modules vs. one central control module. Each module is located at each existing emergency flasher unit and requires only a connection to the existing flasher and ground wires. A plug and play embodiment of the present disclosure does add additional cost and complexity (multiple connectors), but is considerably simpler to install. Also, unique art with the present disclosure is the elimination of the need to provide separate power from the vehicle, as the pulsing power provided by the existing flasher input provides what is necessary to power the strobe light control module and flasher/strobe lights (the wig-wag implementation does require vehicle power). Patent U.S. Pat. No. 12,263,784B2 does show the use of the existing emergency (hazard) button in one embodiment to provide input. However, the existing emergency button does not provide the type of signal control logic as referenced in the patent. The existing vehicle emergency button is a push button design (push on, push off, push on, push off . . . ) and therefore not capable of a long press operation so described. Also, a person cannot operate the button as described as it takes longer to turn off the flashers and back on than a person can physically react (consecutive flasher pulses are less than a second apart). This prevents a person from sequentially stepping through each individual flash. In modern vehicle design, the switch just sends an on/off signal to the Body Control Module or Light Control Module. For the switch to be useable/capable, the actual pulse signal at the existing emergency flasher needs to be monitored for both pulse count and timing. If this is not done, unintentional flasher/strobe activation can result as the same emergency flasher wire to a flasher light carries the turn signal and may also include the brake signal. The present disclosure addresses these issues. The present disclosure strobe light control modules are also capable of independently driving auxiliary strobe lights and a dimming feature for those applications that require user selectable strobes at a reduced brightness level.

There are two strobe systems in the market place that use existing vehicle lights. "Ultra-Bright Lightz" and "Speed Turtle" use the existing OBD2 port under the vehicle dash to interject CANBUS control signals to manage the existing lights. As more and more automakers integrate the Body Control Module (BCM) and Light Control Module (LCM) the ability to interject CANBUS signals to control lighting is eliminated make this system obsolete. Another system called "Game Changer Hideaway Warning System" uses direct connections between the Body Control Module (BCM) and the Light Control Module (LCM). This system is very costly given the number of connections required and the difficulty in accessing the plugs and receptacles. Also, with the trend by automakers to integrate the BCM and LCM, the ability to do this will be eliminated.

What is claimed is:

1. An aftermarket automotive strobe light system for a vehicle having factory corner flasher lamps and a factory emergency flasher activation button that produces a pulsed emergency flasher signal, the system comprising:
   a plurality of independent strobe light control modules, each strobe light control module configured to be installed proximate to a respective factory corner flasher lamp and electrically coupled only in-line with a factory emergency flasher conductor and a ground conductor that normally power the respective factory corner flasher lamp;
   each strobe light control module including a pulse-to-direct-current power circuit configured to derive operating power solely from the pulsed emergency flasher signal and to maintain module operation during OFF intervals of the pulsed emergency flasher signal, and a controller configured to monitor the pulsed emergency flasher signal at the respective lamp location;
   wherein each strobe light control module is configured to detect a user-performed activation sequence generated exclusively by successive actuations, including at least one OFF-then-ON actuation, of the factory emergency flasher activation button and identifiable by a predetermined pulse count of pulses of the pulsed emergency flasher signal, and, in response to detection of the activation sequence, to locally interrupt and replace the pulsed emergency flasher signal with a higher-frequency strobe waveform delivered to the respective factory corner flasher lamp and to one or more auxiliary strobe-only lamps electrically coupled to the respective strobe light control module while the factory emergency flasher activation button remains activated;
   whereby high-visibility strobe operation is provided to the factory corner flasher lamps and the one or more auxiliary strobe-only lamps using the factory emergency flasher activation button without accessing a vehicle communication bus or a centralized vehicle control module.

2. The system of claim 1, wherein the plurality of independent strobe light control modules consists of four strobe light control modules positioned at respective front-left, front-right, rear-left, and rear-right corners of the vehicle.

3. The system of claim 1, wherein the predetermined pulse count comprises a first pulse-count range corresponding to a full-brightness strobe mode and a second pulse-count range corresponding to a reduced-brightness strobe mode.

4. The system of claim 3, wherein the first pulse-count range includes four or five pulses and the second pulse-count range includes six or seven pulses prior to a user-performed OFF-then-ON actuation of the factory emergency flasher activation button.

5. The system of claim 1, wherein the higher-frequency strobe waveform comprises a plurality of strobe pulses occurring during each single pulse period of the pulsed emergency flasher signal.

6. The system of claim 1, wherein each strobe light control module operates independently of all other strobe light control modules without electrical, data, or synchronization communication between modules.

7. The system of claim 1, wherein the pulse-to-direct-current power circuit includes energy storage sufficient to maintain controller operation during flasher OFF intervals.

8. The system of claim 1, wherein at least one strobe light control module includes a strobe-disable switch configured to inhibit strobing of a factory flasher lamp of a regulated color while permitting strobing of the one or more auxiliary strobe-only lamps electrically coupled to the same strobe light control module.

9. The system of claim 8, wherein the factory flasher lamp inhibited by the strobe-disable switch is a rear red lamp and the auxiliary strobe-only lamps emit a non-red color.

10. The system of claim 1, wherein at least one strobe light control module includes a wig-wag enable input configured to alternate strobe activation between strobe light control modules installed on a left side of the vehicle and strobe light control modules installed on a right side of the vehicle.

11. The system of claim 10, wherein the wig-wag enable input is selectively enabled during installation and requires a supplemental steady vehicle voltage input separate from the pulsed emergency flasher signal.

12. The system of claim 1, wherein each strobe light control module is installed using a vehicle-specific plug-and-play pass-through wiring harness having factory-matching connectors and requiring no cutting of factory wiring.

13. The system of claim 1, wherein each strobe light control module is installed by splicing directly into the factory emergency flasher conductor proximate to the respective factory corner flasher lamp.

14. The system of claim 1, wherein at least one additional strobe light control module is installed in-line with a flasher lamp circuit of a trailer electrically coupled to the vehicle, such that trailer flasher lamps strobe in coordination with the vehicle factory corner flasher lamps.

15. The system of claim 14, wherein two strobe light control modules are installed at respective left and right rear corners of the trailer.

16. A method of adding high-visibility strobe capability to a vehicle using one or more strobe light control modules without installing additional dashboard switches or accessing a vehicle communication bus, the method comprising:

installing a strobe light control module in-line with each factory corner flasher lamp circuit using only an existing factory emergency flasher conductor and a ground;

powering each strobe light control module solely from a pulsed factory emergency flasher signal;

monitoring, at each strobe light control module, the pulsed emergency flasher signal for a user-performed pulse-count activation sequence generated by successive actuations, including at least one OFF-then-ON actuation, of a factory emergency flasher activation button; and upon detecting the activation sequence, locally interrupting and replacing the pulsed emergency flasher signal with a higher-frequency strobe waveform delivered to the respective factory corner flasher lamp and to one or more auxiliary strobe-only lamps for a duration that the factory emergency flasher activation button remains activated.

\* \* \* \* \*